United States Patent
Dorsch

[15] 3,677,648
[45] July 18, 1972

[54] METHOD AND APPARATUS FOR THE MEASUREMENT OF DYE DILUTION IN BLOOD

[72] Inventor: Johannes Dorsch, Schonhausenstrasse 11, Bremen, Germany

[22] Filed: June 22, 1970

[21] Appl. No.: 48,194

Related U.S. Application Data

[63] Continuation of Ser. No. 416,863, Dec. 8, 1964, abandoned.

[52] U.S. Cl. ..............................................................356/40
[51] Int. Cl. ......................................................G01n 33/16
[58] Field of Search ..........................356/39, 40, 41; 250/218

[56] References Cited

UNITED STATES PATENTS

| | | | |
|---|---|---|---|
| 3,008,370 | 11/1961 | Uribe | 356/40 |
| 3,066,570 | 12/1962 | Goodman et al. | 356/41 |
| 3,296,922 | 1/1967 | Goldberg | 356/40 |
| 3,437,822 | 4/1969 | Fitzsimmons | 356/40 X |

*Primary Examiner*—Ronald L. Wibert
*Assistant Examiner*—Orville B. Chew, II
*Attorney*—Wolf, Greenfield and Sacks

[57] ABSTRACT

A method for determining cardiac volume parameters wherein a test dye is added to blood and a photometric measurement of the light absorption of dyed blood is carried out by an electro-optical system which includes a photosensitive means to determine dye dilution in the blood.

2 Claims, 10 Drawing Figures

Patented July 18, 1972 3,677,648

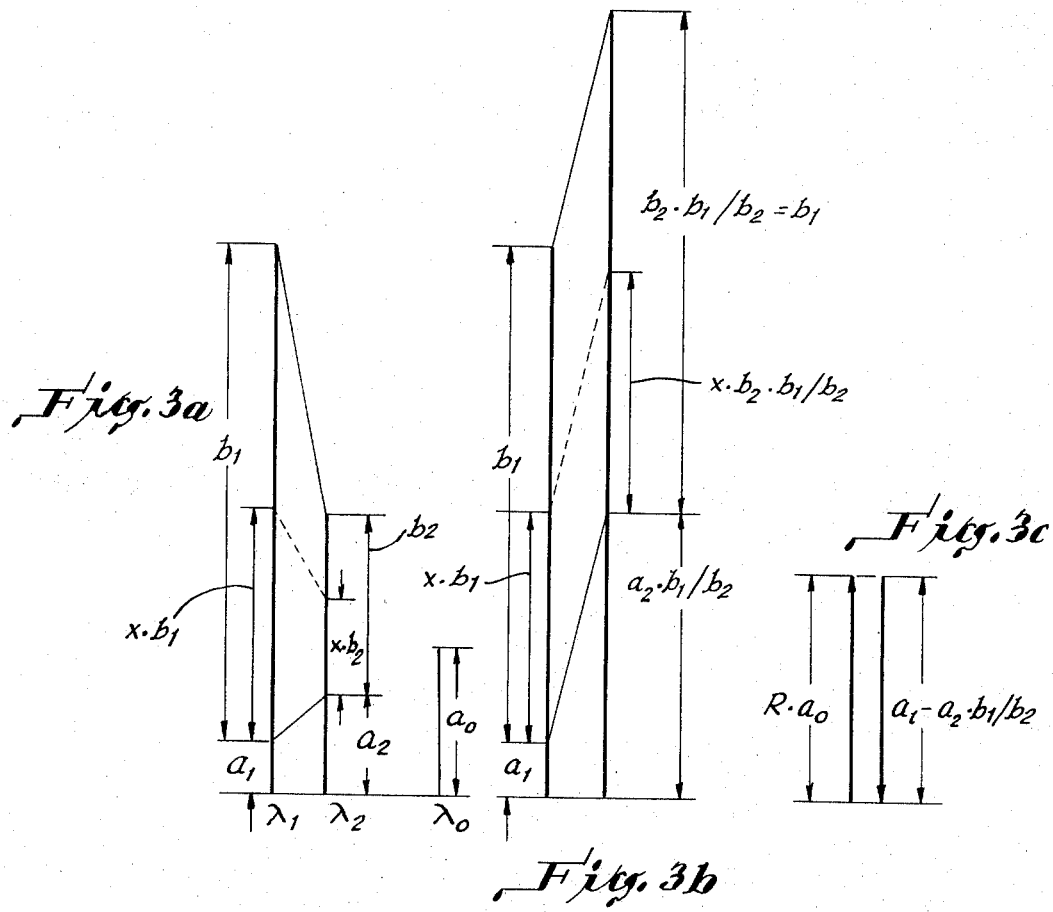
Fig. 3a
Fig. 3b
Fig. 3c
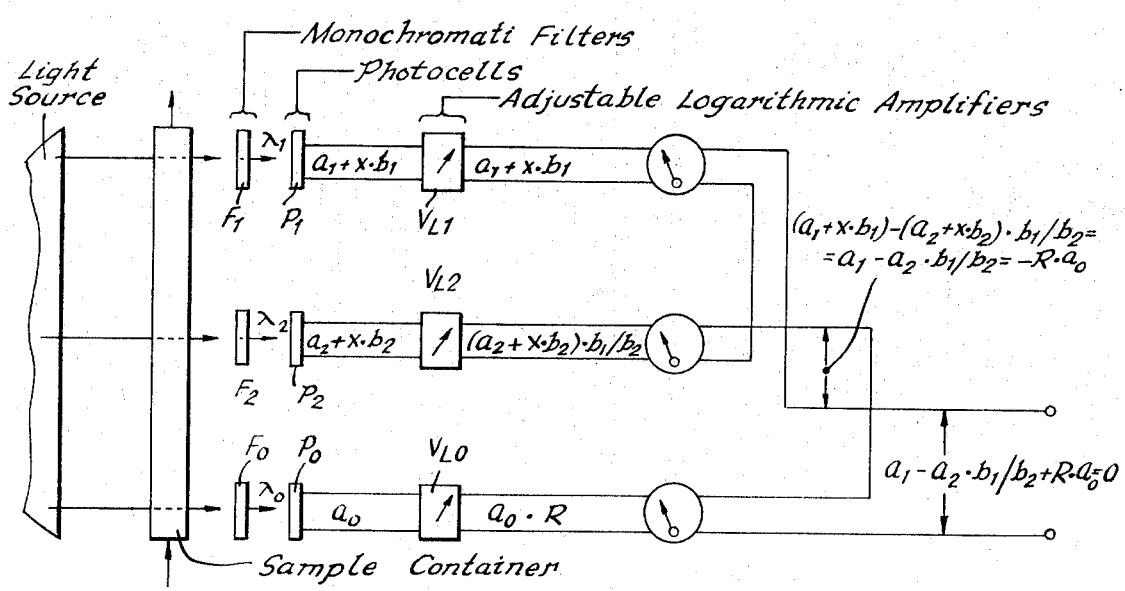
Fig. 6

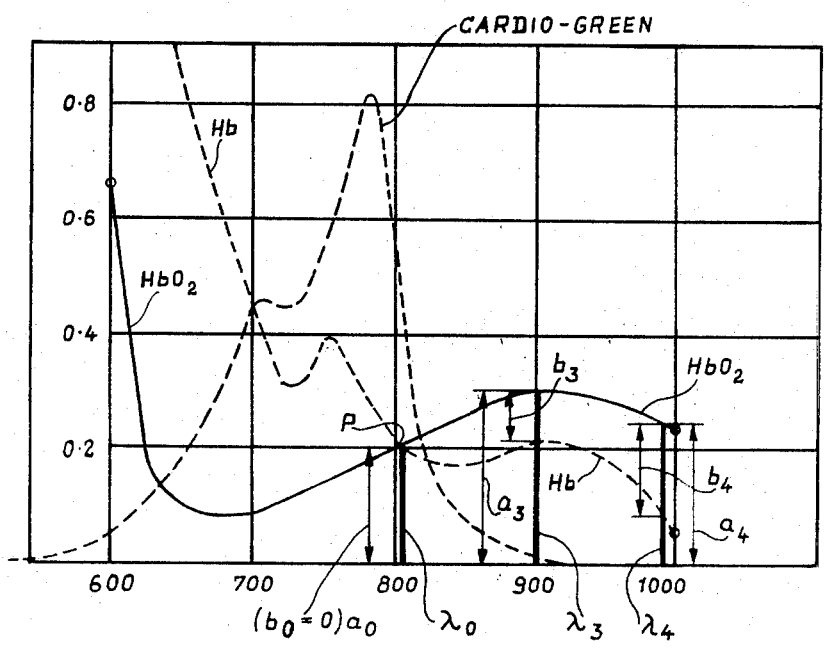

3,677,648

METHOD AND APPARATUS FOR THE MEASUREMENT OF DYE DILUTION IN BLOOD

RELATED APPLICATION

This application is a continuation of copending U.S. Pat. application Ser. No. 416,863 filed Dec. 8, 1964 and now abandoned.

BACKGROUND OF THE INVENTION

Light absorption or extinction (logarithm of light absorption) is dependent not only on concentration of test dye but also on several influences disturbing the measurement of test dye concentration, as for example $O_2$-saturation, concentration C of the natural color components haemoglobin Hb and oxyhaemoglobin $HbO_2$, thickness D of the sample used for measurement (when using the human ear for instance) and is dependent on the velocity of flow of blood through the test region.

The Hb- and $HbO_2$-curves of FIG. 2 of the accompanying drawings representing the extinction dependency of blood (without test dye) with 0 and 100 percent $O_2$-saturation respectively are crossing one another at the so-called isosbestic point at the wavelengths $\lambda_0 = 805$ m$\mu$. At this point extinction is independent of $O_2$-saturation. It is known to compensate the other four influences by forming the difference of extinctions at two different wavelengths while simultaneous maintaining the $O_2$-saturation at a known constant value. However, to maintain $O_2$-saturation at a known constant value during measurement, is most difficult.

SUMMARY OF THE INVENTION

According to the present invention two isosbestic values are established, one of which may be the value of extinction at said natural isosbestic point whereas at least the second one is established artificially by equalizing and nullifying the $O_2$-saturation-dependent components of the extinction values at two wavelengths then equalizing and nullifying said first and second isosbestic extinction values, so that after adding a test dye, absorption values of which are different at the wavelengths belonging to said two isosbestic values, extinction values are dependent only on fluctuations of test dye concentration and independent on fluctuations of $O_2$-saturation, concentration C of the natural color components, thickness D and velocity of flow of blood.

DETAILED DESCRIPTION OF THE INVENTION

For a better understanding of the present invention, reference will now be made to the accompanying drawings, in which:

FIGS. 3a, 3b and 3c are a diagram showing extinctions for various wavelengths, further illustrating said first embodiment;

FIG. 4 is a graph like FIG. 2, illustrating a second embodiment of the new method;

Figure 2:
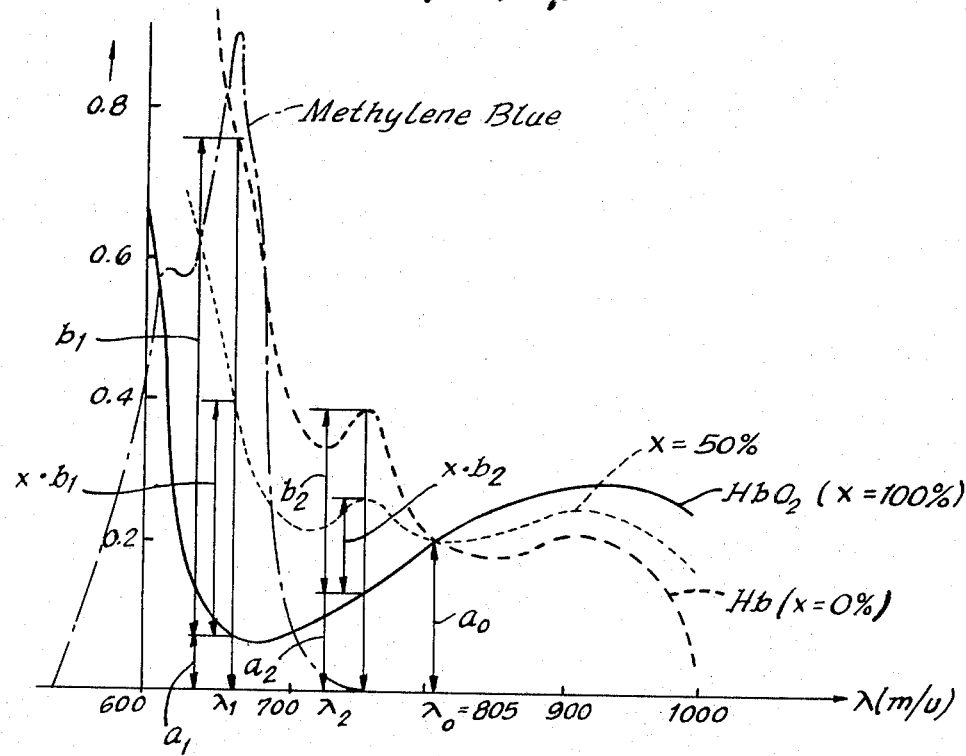
FIG. 2 is a graph showing the extinction relationships of reduced haemoglobin and oxidized haemoglobin, illustrating a first embodiment of the new method.
Figures 5A, 5B, 5C:
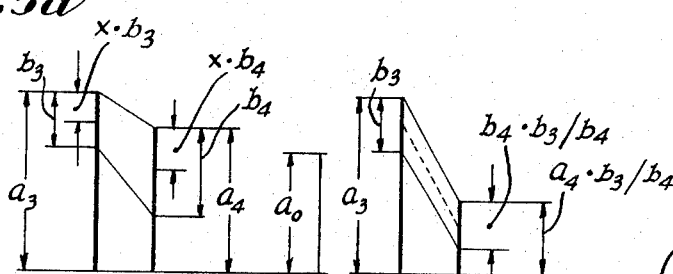

FIGS. 5a, 5b and 5c are a diagram like FIG. 3, further illustrating said second embodiment; and FIG. 6 diagrammatically illustrates an apparatus for continuous measurement of blood in respect of three different color wavelengths; whereby the left and middle part is illustrating the apparatus for the first embodiment according to FIGS. 2 and 3 and the left and right part is illustrating the apparatus for the second embodiment according to FIGS. 4 and 5.

Figure 1:
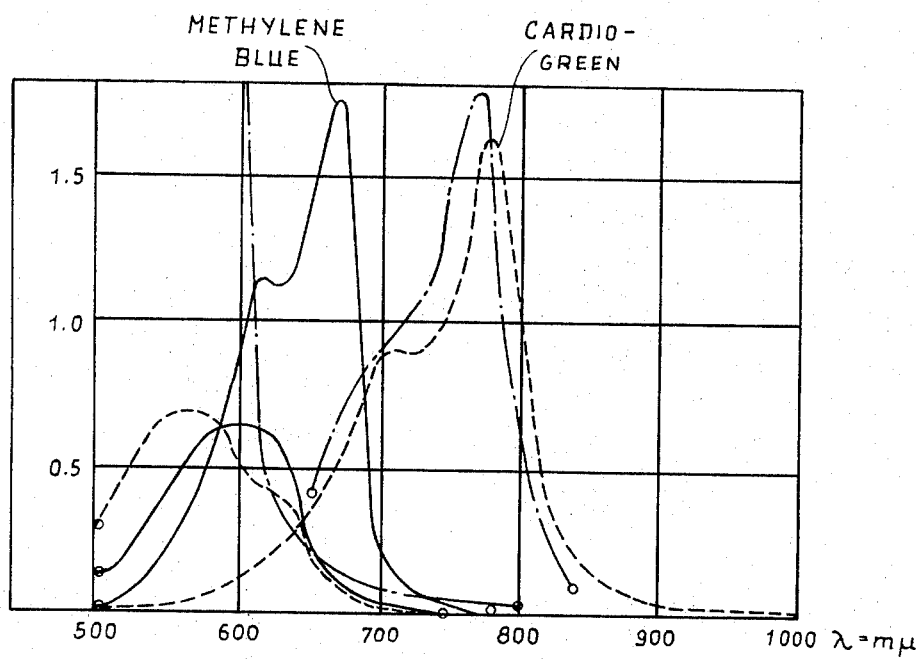
FIG. 1 is a graph showing extinction values and wavelengths, for six known dyes.

For determining cardiac volume parameters by injection of a test dye into blood and photometric measurement of the light absorption of the dyed blood at chosen regions, two dye groups are hitherto customary; the blue dyes, the absorption maxima of which lie between $\lambda = 600$ and 660 m$\mu$, and the so called green dyes, the absorption maxima of which lie at about $\lambda = 800$ m$\mu$, but which extend deep into the short-wave red region. The absorption curves of these and other dyes are shown in FIG. 1 of the accompanying drawings.

In the photometric measurement of light absorption in blood, a so called extinction value is used, in order to lead to a linear representation of the dye concentration in the blood. The extinction value as known in the art is the logarithm of the absorption or the logarithm of decrease of light intensity. These extinction values, however, are normally not only dependent on the added test dye but are influenced in combination by the disturbing extinctions underlying fluctuations from change of 1. $O_2$-saturation,
2. concentration C of Hb and $HbO_2$,
3. thickness D of the sample,
4. velocity of flow of blood.

RE 1 : With 100 % Hb in the blood the extinction (without test dye added) would follow the dotted curve Hb in FIG. 2. For a fixed concentration C of Hb in the blood, fixed thickness D of test sample and fixed flow effect, therefore, the curve Hb in such a case would be used as a zero line for the measurement of the extinction by the test dye after addition of such test dye.

RE 2: Would only $HbO_2$ be present in the blood then with the same three conditions as are pointed out above in connection with Hb as color component, the extinction would follow the curve $HbO_2$ in FIG. 2 and then this curve would be a zero line for measurement of extinction by test dye added to the blood.

RE 3: Overmore the extinction is dependent on the concentration C of said two natural color components Hb and $HbO_2$, so that all values of said curves will increase or decrease in a proportional degree.

RE 4: The extinction is dependent on the thickness D of the sample used for measurement. When using a cuvette the thickness is constant. When using the human body, for instance the human ear, the thickness will be subjected to alterations. Alterations of the thickness D will cause a proportional shifting of the curves Hb and $HbO_2$. The compensation of influences of fluctuations of thickness D is of greatest significance especially in connection with measurements through the blood filled tissue of the ear, in order to suppress the influence of pulsations on the measuring result.

RE 5: The extinction is also dependent on the velocity of flow of blood through the sample or test region. The erythrocytes which contain the blood color haemoglobin are disklike bodies which will orientate into streamline to a degree dependent on the velocity of flow. This orientation will cause a change of extinction which phenomenon is called flow effect.

It is an object of the present invention to provide a measuring method which enables to compensate influences of fluctuations of concentration C, thickness D and flow effect also in the case of varying $O_2$-saturation. Hitherto, it was not possible simultaneously to compensate fluctuations of $O_2$-saturation and said other fluctuations of influences of natural color of the blood, and thereby exclude them as a source of disturbance in test color measurements, since the light wave range which was usable in practice only gave one isosbestic point. Attempts have already been made in connection with green dye measurement, to compensate said three other influences by addition of a wavelength beyond 900 m$\mu$, at which the green dyes no longer had any light absorption, but in this case a sensitivity to $O_2$-saturation occurred. Now by the present invention it is possible to overcome all said four disturbances of extinction, that is to make the measurement of test dye extinction independent of said four disturbances.

At first let us examine the disturbances by the natural color components Hb and $HbO_2$:

In practice is is not possible to use the curve Hb or HbO₂ as zero line, because blood in the human body has a O₂-saturation between zero (hb) and 100 % (HbO₂). Only in one point, the cross point, named natural isosbestic point of the two curves Hb and HbO₂ the extinction is independent on O₂-saturation. Therefore, it is possible to make a measurement at $\lambda_0 = 805$ m$\mu$. After adding the test dye the extinction value $a_0$ will change and the value of increase of extinction at $\lambda_0$ will give a true value of extinction by the test dye if the influences according to the above numbers 2, 3 and 4 are neglected, because alterations of O₂-saturation do not influence the value of extinction $a_0$ in the natural isosbestic point, because in this point Hb and HbO₂ have always the same extinction value $a_0$. Thus, in order to be independent of fluctuations of O₂-saturation it is customary to use the extinction values of a test dye at the natural isosbestic point $\lambda_0 = 805$ m$\mu$. This, of course, is possible in connection only with test dyes of good sensibility at $\lambda_0$ as e.g., cardio-green. This measurement forms hitherto the selected method of measurement especially with patients having high fluctuations of O₂-saturation.

The present invention is based upon the consideration that, if we would have two natural isosbestic points, we could use the measurements in these two points for compensation of said three other disturbing influences according to the above numbers 2, 3 and 4. However, such two natural different isosbestic points are not available. Therefore, according to the invention there is proposed a method to form one or two artificial isosbestic values with the same characteristics as has the extinction value at the natural isosbestic point.

a. example for methylene-blue dye; FIGS. 2, 3

FIG. 2 is illustrating the establishment of such an artificial isosbestic value which may be used in connection with the test dye methylene-blue. To obtain an artificial isosbestic value two $\lambda$-values $\lambda_1$ and $\lambda_2$ are chosen. Preferably these two points are chosen in such a way that one of the two wavelengths, in the example the wavelength $\lambda_1$ will give a high extinction value for the test dye methylene-blue, whereas the other wavelength $\lambda_2$ will give no or a much more lower extinction for the test dye.

The three vertical lines in FIG. 2 indicate the extinction values at three wavelengths which are especially suited for performing the method of the present invention, in connection with methylene-blue as the testing dye.

At $\lambda_1 = 660$ m$\mu$, methylene-blue has its absorption maximum. However, at $\lambda_2 = 760$ m$\mu$ and $\lambda_0 = 805$ m$\mu$, the isosbestic point, it no longer has any significant light absorption.

In the curves of the extinction values for HbO₂ and Hb according to FIG. 2, $a_1$ represents the extinction of HbO₂, and $a_1 + b_2$ represents the extinction of Hb at $\lambda_1 = 660$ m$\mu$. The corresponding extinctions for $\lambda_2 = 760$ m$\mu$ are designated by $a_2$ and $b_2$. Possible alterations of O₂-saturation from 0 to 100 percent take place on the portions $b_1$ and $b_2$. The portion indicated by $a_0$ for $\lambda_0 = 805$ m$\mu$ at the natural isosbestic point P is the same for Hb and HbO₂.

For further explanation, the portions $a_1$, $b_1$ and $a_2$ and $b_2$ for $\lambda_1 = 660$ and $\lambda_2 = 760$ m$\mu$ in FIG. 2 are combined for graphical evaluation as vertical lines, in the form shown in FIG. 3 I. The base line represents zero extinction. If the total extinctions $a_1 + b_1$ and $a_2 + b_2$ for $\lambda_1 = 660$ m$\mu$ and $\lambda_2 = 760$ m$\mu$ are subtracted from each other, then a different value is produced for each O₂-saturation level. The same is true for a C- and D-alteration, which leads to a proportional enlargement or reduction of the portions.

With O₂-saturations of $x\% = 0$ percent, 50 percent or 100 percent for instance the extinctions at $\lambda_1$ and $\lambda_2$ are as is indicated in the three dotted lines of FIG. 1 I:

at $\lambda_1 : a_1 + b_1 \cdot x (= 0, 1$ or $0, 5)$ filters $F_3$, $F_4$, $F_0$ based on the wavelengths $\lambda_3 = 900$, $\lambda_4 = 990$ and $\lambda_0 = 805$ m$\mu$ are arranged. The required monochromatic action can be increased by selection of photocells $P_1$, $P_2$, $P_0$ or $P_3$, $P_4$, $P_0$ with suitable sensitivity spectra. The three extinction actions which are obtained in this way and which are controllable in their degree, may be so co-ordinated by means of a selection switch means, that from any two systems the total value or the difference value of the extinctions can be formed. Such a difference value then allows a difference formation to be effected in relation to the remaining third extinction value $a_0$ at $\lambda_0 = 805$ m$\mu$. If this difference is brought to zero in the measuring device, then it does not change by fluctuations of O₂-saturations and also not by fluctuations of C and D and fluctuations of flow effect and will depend only on the concentration of added test dye.

For the first example, the combination $a + b$ shown in FIG. 6 applies, and for the second example the combination $a + c$ applies.

For further explanation, the portions $a_1$, $b_1$, $x \cdot b_1$ and $a_2$, $b_2$, $x \cdot b_2$ for $\lambda_1 = 660$ m$\mu$ and $\lambda_2 = 760$ m$\mu$ in FIG. 2 are combined for graphical evaluation as vertical lines, in the form shown in FIG. 3 I. The values $a_1 + x \cdot b_1$ and $a_2 + x \cdot b_2$ are available at the outputs of photocells $P_1$, $P_2$ in FIG. 6. The base line represents zero extinction. If the total extinctions $a_1 + x \cdot b_1$ and $a_2 + x \cdot b_2$ for $\lambda_1 = 660$ m$\mu$ and $\lambda_2 = 760$ m$\mu$ would be subtracted from each other, then a different value would remain for each O₂-saturation level. The same is true for a C- and D-alterations, which lead to proportional enlargements or reductions of the portions, which could be expressed by multiplying by a factor $k$ the extinction values $k(a_1 + x \cdot b_1)$ and $k(a_2 + x \cdot b_2)$. Because this factor will change both portions of all the extinction values to the same degree, it can be set $k = 1$ in the following discussion of compensation of fluctuations of O₂-saturation.

The values $a_1 + x \cdot b_1$ and $a_2 + x \cdot b_2$ are effective before the test dye methylene-blue is added to the blood. After addition of the test dye the extinction value $\lambda_1$ will increase by a portion, whereas the extinction at $\lambda_2$ will remain unchanged because the extinction value of the test dye methylene-blue at $\lambda_2$ is approximately zero.

The influence of unknown O₂-saturation of $x$ percent is compensated by the following steps:

a. the extinction value $a_2 + b_2 \cdot x$ at $\lambda_2$ is multiplied by $b_1/b_2$ within a multiplier or amplifier $V_{M2}$ (FIG. 6), so that at the outputs of amplifiers $V_{L1}$ and $V_{L2}$ extinction values $(a_1 + x \cdot b_1)$ and $[(a_2 \cdot b_1)/b_2 + x \cdot b_1]$ are obtained, in which the second portions are equalized to be both $x \cdot b_1$ (compare FIG. 3 II).

b. forming the difference from said output values: $(a_1 + x \cdot b_1) - [(a_2 \cdot b_1)/b_2 + x \cdot b_1] = a_1 - a_2 \cdot b_1/b_2$). This value is independent on O₂-saturation $x$ and only is dependent on C, D and flow effect. Therefore, this extinction value just as the extinction value $a_0$ at the natural isosbestic point $\lambda_0 = 805$ m$\mu$ is independent on changes of O₂-saturation $x$ and therefore is named artificial isosbestic value in the sense of the present invention.

c. Compensation not only of alterations of O₂-saturation but also of influences or changes of C and D and of flow effect, will be explained now.

For compensation of influences of C and D and of flow effect to the extinction value the extinction value $a_0$ at $\lambda_0$ is multiplied by a factor $R$ (i.e., = 1, 45) within multiplier $L_{L0}$ which factor R is chosen in such a manner that the absolute value of the above artificial isosbestic value $|a_1 - a_2 \cdot b_1/b_2|$ is equal to the absolute value of $|R \cdot a_0|$. Therefore, by forming the sum of that two values $a_2 \cdot b_1(b_2 - a_1) - R \cdot a_0$ we obtain after insertion of the test dye a compensated extinction value which essentially is independent on O₂-saturation as well as on concentration C, of the natural blood colors, thickness D and flow effect and only depends upon the concentration of the inserted test dye. From FIG. 2 it may be seen that it is not possible to use the test dye methylene-blue at the natural isosbestic point $\lambda_0$ because the extinction value of methylene-blue at $\lambda_0$ is zero. Therefore, the above method for forming one or more artificial isosbestic points not only gives the possibility of simultaneous compensating O₂-saturation fluctuations and the other three disturbances as will be explained more detailed in the following discussion, but quite apart therefrom gives the advantage that in performing the test dye measurement it is no longer necessary to use the natural isosbestic point at the wavelength $\lambda_0$. As a result test dyes can be used which are unsuitable for the natural isosbestic point like methylene-blue.

b. Example for cardio-green, FIG. 4, 5.

A second example will be given for explaining the application of the three color compensation principle with use of the test dye known as cardio-green (indocyanine green). Hitherto, this dye has been measured only at $\lambda_0 = 805$ m$\mu$, that is to say so as to be independent of $O_2$-saturation. Recently, a two wave compensation arrangement has been proposed by the Waters Corporation in which for compensation of the flow effect, in addition to the dye measurement wavelengths $\lambda_0 = 805$ m$\mu$, a longer compensation wavelength which is independent of the test dye is used. However, a certain degree of dependence on $O_2$-saturation comes into the measurement. The principle of the invention allows this to be eliminated.

In FIG. 4, the spectra of Hb and HbO$_2$ are indicated by three vertical sections at $\lambda_0 = 805$, $\lambda_3 = 900$ and $\lambda_4 = 990$ m$\mu$ which represent the extinctions and total extinctions of Hb and HbO$_2$. They are separately shown as vertical portions in FIG. 5 I.

Just as in the first example the portions $x \cdot b_3$ and $x \cdot b_4$ are equalized by multiplying $x \cdot b_4$ within amplifier $V_{L4}$ by the factor $b_3/b_4$ (FIG. 5 II). Then the artificial isosbestic value $$(a_3 + x \cdot b_3) - (a_4 + x \cdot b_4) \cdot b_3/b_4 = a_3 - a_4 \cdot b_3/b_4$$

is formed by forming the difference of outputs of $V_{L3}$ and $V_{L4}$ and the sum or difference of this artificial isosbestic value and the natural isosbestic value $a_0$ is formed after having equalized these two isosbestic values by multiplying the natural isosbestic value $a_0$ by an equalizing factor $f$.

This allows a continuous test color measurement for cardio-green which is independent of $O_2$-saturation and of C- and D-alterations and flow effect. For measurement by means of the ear, the same considerations are true, but a further extinction for the light absorption of the tissue has to be added to all total extinctions, the tissue acting practically as a grey filter which does not change during the measurement.

For the first example, the combination II shown in FIG. 6 applies, and for the second example the combination III applies.

Many alterations and other embodiments are possible within the scope of the invention. More particularly, the provision of an artificial isosbestic value also has independent significance whether or not a C- and D-compensation is to be obtained by use of two isosbestic values. The compensation for forming an artificial isosbestic value can be achieved also by proportional formation instead of by difference or sum formation.

I claim:

1. A method for determining cardiac volume parameters wherein a test dye is added to blood and a photometric measurement of the light absorption of dyed blood is carried out by an electro-optical system which includes a photosensitive means to determine dye dilution in the blood, said method comprising the steps of,
   a. measuring the light absorption values of the blood without any dye added at a first wavelength,
   b. measuring the light absorption values of the blood without any dye added at a second wavelength,
   c. operating said electro-optical system to obtain modified light absorption values by equalizing the $O_2$-saturation-dependent portions of said light absorption values at said first and second wavelengths by multiplying the light absorption value at said second wavelength by a factor equal to the $O_2$-saturation-dependent portion at the minimum of $O_2$-saturation at said first wavelength divided by the $O_2$-saturation-dependent portion at the minimum of $O_2$-saturation at said second wavelength,
   d. subtracting said modified light absorption value at said second wavelength from said light absorption at said first wavelength, the difference value thus being independent of $O_2$-saturation to establish a first artificial isosbestic value,
   e. deriving a second artificial isosbestic value by the same steps as set forth in steps (a) to (d) using absorption measurement at two wavelengths different from said first and second wavelengths,
   f. operating said electro-optical system to equalize said first artificial isosbestic value independent of $O_2$-saturation and said second artificial isosbestic value independent of $O_2$-saturation,
   g. forming a compensated difference value which is the difference between said first artificial isosbestic value and said second artificial isosbestic value and this compensated difference value being zero before adding test dye and independent of $O_2$-saturation, concentration, layer thickness and flow effect,
   h. adding a test dye to the blood the absorption values of which at said first and second wavelengths are different from the absorption values at said two other wavelengths and then,
   i. determining the light absorption values of the dyed blood by measuring the variations of said compensated difference value (under step (g)).

2. A method for determining cardiac volume parameters wherein a test dye is added to blood and a photometric measurement of the light absorption of the dyed blood is carried out by an electro-optical system which includes a photosensitive means to determine dye dilution in the blood, said method comprising the steps of,
   a. measuring the light absorption values of the blood without any dye added at a first wavelength,
   b. measuring the light absorption values of the blood without any dye added at a second wavelength,
   c. operating said electro-optical system to obtain modified light absorption values by equalizing the $O_2$-saturation-dependent portions of said light absorption values at said first and second wavelengths by multiplying the light absorption value at said second wavelength by a factor equal to the $O_2$-saturation-dependent portion at the minimum of $O_2$-saturation at said first wavelength divided by the $O_2$-saturation-dependent portion at the minimum of $O_2$-saturation at said second wavelength,
   d. subtracting said modified light absorption value at said second wavelength from said light absorption at said first wavelength, the difference value thus being independent of $O_2$-saturation to establish a first artificial isosbestic value,
   e. deriving a second isosbestic value by measuring the light absorption values of the blood at the wavelength of the natural isosbestic point of the blood ($\lambda_0 = 805$),
   f. operating said electro-optical system to equalize said first artificial isosbestic value independent of $O_2$-saturation and said second isosbestic value independent of $O_2$-saturation,
   g. forming a compensated difference value which is the difference between said first artificial isosbestic value and said second isosbestic value and this compensated difference value being zero before adding test dye and independent of $O_2$-saturation, concentration, layer thickness and flow effect,
   h. adding a test dye to the blood the absorption values of which at said first and second wavelengths are different from the absorption values at said two other wavelengths and then,
   i. determining the light absorption values of the dyed blood by measuring the variations of said compensated difference value (under step (g)).

* * * * *